United States Patent [19]

Disteldorf et al.

[11] Patent Number: 4,463,154
[45] Date of Patent: Jul. 31, 1984

[54] POLYURETHANE POWDER ENAMELS FREE OF CLEAVAGE PRODUCTS AS WELL AS ENAMEL COATINGS PRODUCED FROM SUCH POWDERS

[75] Inventors: Josef Disteldorf, Herne; Rainer Gras, Bochum; Horst Schnurbusch; Werner Hübel, both of Herne; Elmar Wolf, Recklinghausen, all of Fed. Rep. of Germany

[73] Assignee: Chemische Werke Huels AG, Marl, Fed. Rep. of Germany

[21] Appl. No.: 460,942

[22] Filed: Jan. 25, 1983

Related U.S. Application Data

[63] Continuation of Ser. No. 292,712, Aug. 13, 1981, abandoned.

[30] Foreign Application Priority Data

Aug. 13, 1980 [DE] Fed. Rep. of Germany ....... 3030539

[51] Int. Cl.³ ............................................. C08G 18/80
[52] U.S. Cl. .................................... 528/45; 525/440; 525/457; 525/504; 525/509; 528/73
[58] Field of Search .................... 528/45, 73; 525/329, 525/440, 457, 504, 509

[56] References Cited

U.S. PATENT DOCUMENTS 3,998,794 12/1976 Müller et al. .......................... 528/73

FOREIGN PATENT DOCUMENTS 2420475 11/1975 Fed. Rep. of Germany .
2502934 7/1976 Fed. Rep. of Germany .

OTHER PUBLICATIONS

Chem. Abstr., vol. 85, 144945q, 1976, p. 109.
Chem. Abstr., vol. 84, 91789n, 1976.

*Primary Examiner*—Maurice J. Welsh
*Attorney, Agent, or Firm*—Oblon, Fisher, Spivak, McClelland & Maier

[57] ABSTRACT

A polyurethane powder enamel free of volatile cleavage products comprising an adduct of the uretidindione dimer of isophorone diisocyanate with a diol, wherein the adduct has the formula

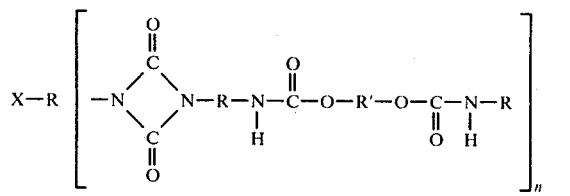

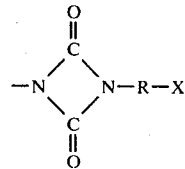

wherein
R =

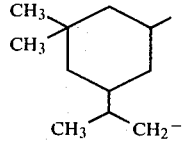

X = NCO or

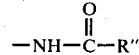

R″ = a divalent aliphatic, cycloaliphatic, aromatic or araliphatic hydrocarbon radical or a diol, n > 1, and
R′ = a monoalcohol radical or primary or secondary monoamine radical with 1–30 C-atoms, wherein the NCO/OH ratio of the dimer to the diol is from 1:0.5 to 1:0.9, the dimer/diol molar ratio is from 2:1 to 6:5, the average molecular weight is between 550 and 4300, and the melting point is ≧70° C. and ≦130° C., and wherein the uretidinedione groups present in the adduct are cleavable with heat into ≧98% —NCO groups, and a polyol having an OH functionality ≧3.4 to ≦7, an average molecular weight of 2000 to 5000, an OH number between 30 and 100 mg KOH/g, a viscosity of <100,000 mpa.s at 160° C., and a melting point ≧70° C. and ≦120° C., and wherein the mole ratio of the adduct to the polyol is chosen so that the ratio of NCO groups in the adduct to OH groups in the polyol is from 0.8:1 to 1.2:1.

14 Claims, No Drawings

POLYURETHANE POWDER ENAMELS FREE OF CLEAVAGE PRODUCTS AS WELL AS ENAMEL COATINGS PRODUCED FROM SUCH POWDERS

This is a continuation of application Ser. No. 292,712, filed Aug. 13, 1981 and now abandoned.

BACKGROUND OF THE INVENTION

1. Field of the Invention

The present invention relates to polyurethane powder enamels derived from isophorone diisocyanates that are free of cleavage products, which have very good storage stability, and which cure above 120° C. to form impact resistant, glossy, weather resistant enamel films, as well as to the enamel coatings produced from the powders so prepared.

2. Description of the Prior Art

From German OS No. 25 02 934 it is known to produce PUR-powder enamels, in which polyisocyanates that contain latent isocyanate groups present at the same time both as uretidinedione groups and as terminal isocyanate groups blocked with blocking agents, are cured with polyols. Depending on the particular blocking agent used, more or less extensive environmental pollution occurs during the curing process. Furthermore, in this case, the functional groups of the cross-linking component play no part in the production of the enamel.

Additionally, in German OS No. 24 20 475 polyurethane powder enamels are described that are produced by the reaction of polyisocyanates having uretidinedione groups with polyols. However, the examples are limited to the uretidinedione dimer of toluene diisocyanate and the uretidinedione dimer of hexamethylene diisocyanate. Also it is necessary in this case to compensate for the higher functional portion of the cross-linking agent with monofunctional reagents, i.e., the uretidinedione/isocyanurate mixtures must first be linearized.

With the dimerizaton catalysts belonging to the prior art (tertiary phosphines) it has hitherto not been possible to produce an isocyanurate-free uretidinedione dimer of isophorone diisocyanate (IPDI). A uretidinedione dimer of isophorone diisocyanate produced in accordance with German OS No. 16 70 720 or German OS No. 19 34 763 contains an additional ca. 20-40% by weight of the trimeric IPDI (isocyanurate trimer of isophorone diisocyanate) in the mixture, depending on the reaction conditions.

Thus, it is not surprising that until now no polyurethane powder enamels free of cleavage products were known that were prepared from polyols and linear polyisocyanate polyaddition compounds which are irreversibly blocked, partially or completely, and which contain uretidinedione groups, because the prerequisite for producing the above-mentioned polyaddition compounds containing uretidinedione groups is that the uretidinedione-containing diisocyanate added to extend the chain by reacting with the diols must have an NCO functionality of 2. When the NCO functionality of the uretidinedione-containing diisocyanate is >2 at least some gelling must be expected when it is reacted with diols.

Therefore the known uretidinedione dimer of isophorone diisocyanate, which contains isocyanurate, cannot be considered when further reaction with diols is intended to prepare useful starting materials for polyurethane chemistry (binding components for PUR powders free of blocking agents). Thus an isocyanate-free uretidinedione dimer of isophorone diisocyanate is still needed.

SUMMARY OF THE INVENTION

Production of blocking agent-free polyurethane powder enamels according to the invention was first made possible by the discovery of a catalyst for dimerization of IPDI that permitted the production of a practically isocyanurate-free uretidinedione dimer of isophorone diisocyanate which can be more than 98% decomposed by heating back into IPDI.

The production of this uretidinedione-containing isophorone diisocyanate is not the subject of this patent application. It is prepared by dimerizing isophorone diisocyanate, optionally in an inert organic solvent, with the help of a catalyst of the general formula

wherein
 m=0, 1 or 2
 X=Cl, OR or R, and
 R=identical or different alkyl radicals, aralkyl radicals or cycloalkyl radicals (optionally alkyl substituted), or two (R-1H) radicals together form a ring,
at temperatures of 0°-80° C., preferably 10°-30° C. After a conversion of 5-70%, preferably 20-50%, the 1,3-diazacyclobutanedione-2,4 may be isolated from the reaction mixture, without prior deactivation of the catalyst, as the residue remaining after thin film distillation. Monomer and catalyst may be isolated in the distillate.

The formation of the polyadduct, which is also not claimed in this application, is carried out by reaction of this pure uretidinedione dimer of isophorone diisocyanate with diols.

Furthermore, production of the polyurethane powder enamels free of cleavage products according to the invention only became possible with the successful production of polyhydroxy compounds which, due to their physical and chemical properties, assure excellent stability, and due to their low melt viscosity, assure a good flow of the enamel films.

It has now been found that extremely high quality polyurethane powder enamels are obtainable by using as cross-linking agents certain isocyanurate-free isophorone diisocyanate polyaddition products which contain uretidinedione groups, and which are essentially free from isocyanate blocking groups that would split off and become volatile under curing conditions, in combination with polyhydroxy compounds having low melt viscosity and sufficient hydroxyl functionality to cross-link the enamel film. In addition, the coating media according to the invention have the advantage of providing enameling even in thick layers without film flaws such as bubbles and pits. The fact that no blocking agent is liberated during the curing process constitutes a very substantial advantage. The physiological iritation of workers is avoided, devices to remove offensive odors can be eliminated and there are practically no environmental problems. Furthermore, the economic aspect cannot be ignored, particularly inasmuch as all components are completely incorporated into the enamel film without loss, i.e., of the blocking agent.

Accordingly, the object of the present invention is a process for preparing polyurethane powder enamels free of cleavage products, having good storage stability, which are curable above 120° C., and which are based on linear polyisocyanate addition products which are irreversibly, partially and completely, blocked and which contain uretidinedione groups, and polyols, characterized in that, a. linear isophorone diisocyanate-diol polyaddition adducts which are irreversibly, partially or completely, blocked with terminal monoalcohols or monoamines and which contain uretidinedione groups, whose uretidinedione groups derived from isophorone diisocyanate can be more than 98% decomposed back into isophorone diisocyanate by heating, having the following formula

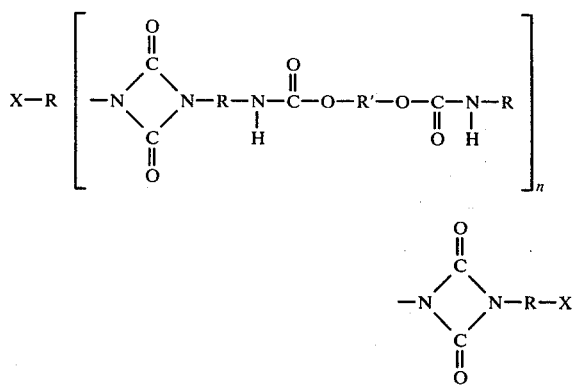

wherein
R =

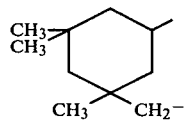

X =

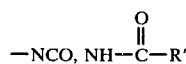

R' = a divalent aliphatic, cycloaliphatic, aromatic or araliphatic hydrocarbon radical of a diol, $n \geq 1$, R" = a monoalcohol radical or primary or secondary monoamine radical having 1-30 C-atoms having an NCO/OH ratio of uretidinedione dimer of isophorone diisocyanate to diol of 1:0.5 to 1:0.9, preferably 1:0.6 to 1:0.8, a uretidinedione/diol molar ratio between 2:1 and 6:5, preferably 3:2 to 5:4, a molecular weight between 550 and 4300, preferably between 1500 and 2000, and a melting point of $\geq 70°$ C. to $\leq 130°$ C., preferably 85° C. to 120° C., b. polyhydroxy compounds having an OH functionality of $\geq 3.4$ to $\leq 7$, preferably 3.7 to 4.5, an average molecular weight of 2000 to 5000, preferably 2500 to 4500, a hydroxyl number between 30 and 100 mg KOH/g, preferably between 40 and 80 mg KOH/g, a viscosity of <100,000 mPa.s, preferably <40,000 mPa.s at 160° C. and a melting point of $\geq 70°$ C. to $\leq 120°$ C., preferably 75° C. to 100° C., and c. the additives customary in polyurethane chemistry are reacted, wherein the molar ratio of a. and b. is selected so that the NCO/OH ratio is 0.8:1 to 1.2:1.

The common additives include accelerating catalysts, pigments, dyes, and fillers. The catalysts are added in amounts of 0.05–1.5% by weight, preferably 0.1–0.5% by weight. The proportion of filler is large; it can be up to 60% by weight, preferably up to 50% by weight.

A further object of the invention is the polyurethane powder enamel prepared as claimed.

DETAILED DESCRIPTION OF THE PREFERRED EMBODIMENT

The isocyanurate-free uretidinedione dimer of isophorone diisocyanate is highly viscous at room temperature (>$10^6$ mPa.s; at 60° C., $13.10^3$ mPa.s; at 80° C., $1.4.10^3$ mPa.s). Its NCO content is in the range of 16.8–18% NCO; i.e., fairly high concentrations of IPDI must be present in the reaction product. The monomer content is 1%. The NCO content of the reaction product after being heated to 180°–200° C. is 37.1–37.7% NCO.

This uretidinedione dimer of isophorone diisocyanate is first reacted with a diol in an NCO/OH ratio of 1:0.5 to 1:0.9, preferably 1:0.6 to 1:0.8; then follows a reaction with irreversible blocking agents such as monoalcohols or monoamines. The process can be conducted so that the diol is added to the uretidinedione dimer of isophorone diisocyanate all at once or gradually. Accordingly, the blocking with monoalcohols or monoamines is partial or complete.

Examples of such diols include ethylene glycol, 1,2- and 1,3-propylene glycol, 2-ethyl-1,3-hexanediol, 1,6-hexanediol, 1,8-octanediol, neopentyl glycol, 1,4-bishydroxymethylcyclohexane, 3(4),8(9)-bishydroxymethyl-tricyclodecane, 2-methyl-1,3-propanediol, 3-methyl-1,5-pentanediol, diethylene glycol, triethylene glycol, tetraethylene glycol, dipropylene glycol and dibutylene glycol, the preferred linking diol used in the structure is 1,4-butylene glycol.

Suitable monohydric alcohols include methanol, ethanol, n-butanol, 2-ethylhexanol, n-decanol and cyclohexanol. The compounds according to the invention are particularly suited as binding agent components for PUR powder enamels which do not release any blocking agent during curing.

The reagents are mixed together in the given ratios to produce the polyaddition adduct. In general, one begins with the isocyanate component containing the uretidinedione, the diol is added, and then the monofunctional reagent. The reaction can be carried out neat or also in the presence of suitable solvents. The following, for example, are suitable solvents: benzene, toluene, methyl or ethyl glycol acetate, dimethylformamide, xylene and other aromatic or aliphatic hydrocarbons; also ketones, such as acetone, methyl butyl ketone, methyl isobutyl ketone, and cyclohexanone and chlorinated aromatic hydrocarbons, as well as any mixtures of these and other inert solvents.

The reaction is generally carried out at temperatures of 50°–120° C., preferably 60°–90° C. The reagents are heated at the given temperatures until all glycol hydroxyl groups have been converted into urethane groups. Depending on the reaction temperature, this lasts from 0.5 to 4 hours. After that, the monoalcohol is added, and the reaction mixture is additionally heated until the amount of NCO equivalent to the amount of OH used has reacted. In the workup of the reaction mixture, the polyuretidinedione-polyurethane is generally freed of any solvent that might have been used. This can be done by simply removing the solvent in a vacuum. Melt extrusion with an evacuated screw is especially suited for removing the solvent.

Isocyanate polyaddition accelerating catalysts can also be used. The preferred catalysts used are organic tin compounds such as tin(II) acetate, tin(II) octanoate, tin(II) laurate, dibutyltin diacetate, dibutyltin maleate or dioctyltin diacetate. The catalysts are generally added in amounts between 0.01 and 0.05% by weight, based on the total amount of reactants.

Primary or secondary monoamines can also be used as blocking agents in place of the monoalcohols. The following are examples of suitable monoamines: n-propylamine, n-butyl amine, n-hexylamine, dibutylamine and dicyclohexylamine.

It is recommended when reacting the adduct of the uretidinedione dimer of isophorone diisocyanate and the diol with primary or secondary monoamines that the amine be added in portions because the $NH_2$/NCO reaction is very fast and proceeds with liberation of large amounts of heat. The reaction product is isolated as indicated above. The total NCO content can be determined by titration with di-n-butylamine, while the content of free NCO groups can be determined by titration with di-sec-butylamine.

The partially or completely blocked isophorone diisocyanate-uretidinedione polyaddition adducts according to the invention can be ground or pulverized and can be homogeneously dispersed in this form in the reagents. One great advantage is the fact that these uretidinedione polyaddition adducts used in accordance with the invention are reactive powders that can undergo defined cross-linking reactions with reagents without elimination of any blocking agent. Such reagents are those carrying functional groups that react with isocyanate groups during the curing process, depending on the temperature and the time, e.g., hydroxyl, carboxyl, mercapto, amino, amido, urethane and (thio)urea groups. Polymerizates, polycondensates and polyaddition compounds can be used as polymers.

The preferred components are primarily polyethers, polythioethers, polyacetals, polyesteramides, epoxide resins with hydroxyl groups in the molecule, phenol/-formaldehyde resins, aminoplasts and their derivatives modified with polyfunctional alcohols, aninline/formaldehyde resins, polyazomethines, polyurethanes, polyureas and polythioureas, polysulfonamides, melamine derivatives, cellulose esters and ethers, partially saponified homopolymers and copolymers of vinyl esters, and especially polyesters and acrylate resins.

The polymers containing hydroxyl groups used according the the invention have an OH functionality of $\geq 3.4$ to $\leq 7$, preferably 3.7 to 4.5, a hydroxyl number between 30 and 120 mg KOH/g, preferably 40-100 mg KOH/g, a viscosity of $<100,000$ mPa.s, preferably $<40,000$ mPa.s, at 160° C., and a melting point $\geq 65°$ C. and $\leq 130°$ C., preferably 75° C. to 100° C.

The preferred components are enumerated below:

For the production of polyesters, the preferred carboxylic acids can be aliphatic, cycloaliphatic, aromatic and/or heterocylic in nature and can optionally be substituted, by halogen atoms, for example. They may also be unsaturated.

Examples are the following: succinic acid, adipic acid, suberic acid, azelaic acid, sebacic acid, phthalic acid, terephthalic acid, isophthalic acid, trimellitic acid, pyromellitic acid, tetrahydrophthalic acid, hexahydrophthalic acid, di- and tetrachlorophthalic acid, endomethylenetetrahydrophthalic acid and its hexachloro derivative, glutaric acid, maleic acid, fumaric acid or their existing anhydrides, dimers and trimers of fatty acids such as oleic acid, optionally in mixtures with monomeric fatty acids, dimethyl terephthalate, terephthalic acid bis-glycol ester, also cyclic monocarboxylic acids such as benzoic acid, tertbutylbenzoic acid or hexahydrobenzoic acid. Possible polyhydric alcohols are, e.g.: ethylene glycol, 1,2- and 1,3-propylene glycol, 1,4- and 2,3-butylene glycol, di-$\beta$-hydroxyethylbutanediol, 1,6-hexanediol, 1,8-octanediol, neopentyl glycol, cyclohexanediol, 1,4-bis(hydroxymethyl)cyclohexane, 2,2-bis(4-($\beta$-hydroxyethoxy)phenyl)propane, 2-methyl-1,3-propanediol, glycerin, trimethylolpropane, 1,2,6-hexanetriol, 1,2,4-butanetriol, tris($\beta$-hydroxyethyl)isocyanurate, trimethylolethane, pentaerythritol, quinitol, mannitol and sorbitol, formoses and their hydroxyalkylation products, methylglycoside, diethylene glycol, triethylene glycol, tetraethylene glycol, polyethylene glycols, dipropylene glycol, tripropylene glycol, polypropylene glycols, dibutylene glycol, polybutylene glycols and xylylene glycol. Mono- and polyesters of lactones, e.g., $\epsilon$-caprolactam or hydroxycarboxylic acids, such as, e.g., hydroxypivalic acid, $\omega$-hydroxydecanoic acid, $\omega$-hydroxycaproic acid and thioglycolic acid, can also be used as well as polyesters of the above named polycarboxylic acids or their derivatives and polyphenols such as hydroquinone, bisphenol-A, 4,4'-dihydroxybiphenyl or bis-(4-hydroxyphenyl)sulfone; fatty acid-modified polyesters ("oil alkyds") and naturally occurring saturated or unsaturated polyesters, their decomposition products or transesterification products with polyols such as castor oil, tall oil, soybean oil and linseed oil; polyesters of the carboxylic acids, which can be obtained by conventional procedures from hydroquinone, diphenylolpropane, p-xylene glycol, ethylene glycol, butanediol or 1,6-hexanediol and other polyols through conventional condensation reactions, e.g., with phosgene or diethyl- or diphenyl carbonate, or from cyclic carbonates such as glycol carbonate or vinylidenecarbonate by conventional polymerization; polyesters of silicic acids; polyesters of phosphonic acids, e.g., of methane-, ethane-, $\beta$-chloroethane-, benzene- or styrenephosphonic acid, or -phosphonic acid esters and polyalcohols or polyphenols of the type mentioned above; polyesters of phosphorus-containing acids from phosphorous acid, phosphorous acid esters, -ester amides or -ester chlorides and polyalcohols, polyetheralcohols and polyphenols; polyesters of phosphoric acid, e.g., from polyesters of phosphorous acid by oxidation or through transesterification of phosphoric acid esters with polyalcohols or polyphenols; polyesters of boric acid; polysiloxanes such as those products obtained by hydrolysis of dialkyldichlorosilanes with water and subsequent treatment with polyalcohols or by addition of polydihydrosilane to olefins such as allyl alcohol or acrylic acid.

Preferred polyesters also include, for example, the reaction products of polycarboxylic acids and glycidyl compounds as described, e.g., in German OS No. 24 10 513.

The following are examples of glycidyl compounds that can be used: esters of 2,3-epoxy-1-propanol with monobasic acids having 4-18 carbon atoms such as glycidyl palmitate, glycidyl laurate and glycidyl stearate; alkylene oxides having 4 to 18 carbon atoms such as butylene oxide and glycidyl ethers such as octyl glycidyl ether.

The polycarboxylic acids listed hereinbelow under II can be used in this method as the dicarboxylic acids. Monocarboxylic acids which are listed under III, for example, can also be used.

Monomeric esters are also preferred ingredients, e.g., dicarboxylic acid bis(hydroxyalcohol) esters, monocarboxylic acid esters with more than dihydric polyols and oligoesters that can be produced by condensation from raw materials common in enamel chemistry.

Such compounds are, for example:
I. Alcohols having 2–24, preferably 2–10 C-atoms, and 2–6 OH groups bonded to nonaromatic C-atoms, e.g., ethylene glycol, propylene glycols, diethylene glycol, dipropylene glycol, butandiols, neopentyl glycol, hexanediols, hexanetriols, perhydrobisphenol, dimethylolcyclohexane, glycerin, trimethylolethane, trimethylolpropane, pentaerythritol, dipentaerythritol, mannitol;
II. Di- and polycarboxylic acids having 4–36 C-atoms and 2–4 carboxyl groups, as well as their derivatives capable of esterification, such as anhydrides and esters, e.g. phthalic acid (anhydride), isophthalic acid, terephthalic acid hexahydroterephthalic acid, hexahydroisophthalic acid, alkyltetrahydrophthalic acids, endomethylenetetrahydrophthalic acid anhydride, adipic acid, succinic acid, maleic acid, fumaric acid, dimeric fatty acids, trimellitic acid, pyromellitic acid, azelaic acid;
III. Monocarboxylic acids having 6–24 C-atoms, e.g., caprylic acid, 2-ethylhexanoic acid, benzoic acid, p-tert-butylbenzoic acid, hexahydrobenzoic acid, monocarboxylic acid mixtures of natural oils and fats such as coconut oil fatty acid, soybean oil fatty acid, castor oil fatty acid, hydrated and isomerized fatty acids, such as "Konjuvandol"-fatty acid, as well as their mixtures, wherein the fatty acids can also be used as glycerides and can be modified by transesterification and/or dehydration;
IV. Monohydric alcohols having 1–18 C-atoms, e.g., methanol, ethanol, isopropyl alcohol, cyclohexanol, benzyl alcohol, isodecanol, nonanol, octanol and oleyl alcohol.

The polyesters can be obtained in known manner by condensation in an inert gas atmosphere at temperatures of 100°–260° C., preferably 130°–220°, in the melt or by an azeotropic procedure, as described in, e.g., Methods of Organic Chemistry (Houben-Weyl), Vol 14/2. 1–5, 21–23, 40–44, Georg Thieme Verlag, Stuttgart, 1963, or by C. P. Martens, Alkyd Resins, 51–59, Reinhold Plastics Appl. Series, Reinhold Publishing Co., New York, 1961.

Preferred acrylate resins which can be used as the OH component are homo- or copolymers. For example, the following monomers can be selected as starting materials: esters of acrylic acid and methacrylic acid with dihydric, saturated aliphatic alcohols having 2–4 C-atoms, such as, e.g., 2-hydroxyethyl acrylate, 2-hydroxypropyl acrylate, 4-hydroxybutyl acrylate and the corresponding methacrylic acid esters; acrylic acid and methacrylic acid; acrylic acid and methacrylic acid alkyl esters having 1–18, preferably 1–8 C-atoms in the alcohol component, such as methyl acrylate, ethyl acrylate, propyl acrylate, isopropyl acrylate, n-butyl acrylate, tert-butyl acrylate, 2-ethylhexyl acrylate, stearyl acrylate and the corresponding methacrylic acid esters; acrylic acid and methacrylic acid cyclohexyl esters; acrylonitrile and methacrylonitrile; acrylamide and methacrylamide; N-methoxymethyl(meth)acrylamide.

Particularly preferred acrylic resins are copolymers of:
a. 0–50% by weight monoesters of acrylic or methacrylic acid with di- or polyhydric alcohols, such as 1,4-butanediol monoacrylate, hydroxypropyl (meth)acrylate; also vinyl glycol, vinyl thioethanol, allyl alcohol, 1,4-butanediol monovinyl ether;
b. 5–95% by weight esters of acrylic acid or methacrylic acid with monohydric alcohols containing 1 to 12 carbon atoms, such as methyl methacrylate, ethyl acrylate, n-butyl acrylate or 2-ethylhexyl acrylate;
c. 0–50% by weight aromatic vinyl compounds, such as styrene, methylstyrene or vinyl toluene;
d. 0–20% by weight of other monomers having functional groups such as acrylic acid methacrylic acid, crotonic acid, itaconic acid, maleic acid, fumaric acid, maleic acid anhydride, maleic acid half ester, acrylamide, methacrylamide, acrylonitrile or N-methylol(meth)acrylamide as well as glycidyl (meth)acrylate, wherein the proportion of group a. and/or d. amounts to at least 5% by weight.

The acrylate resins can be prepared by customary methods, i.e., solution-, suspension-, emulsion- or precipitation-polymerization, preferably by polymerization in the absence of a solvent with initiation by UV light.

Other polymerization initiators are the common peroxides or azo-compounds, such as dibenzoyl peroxide, tert butyl per enz ate, or azobisisobutyronitrile. The molecular weight can be regulated with sulfur compounds such as tert-dodecyl mercaptan.

Preferred polyethers can be produced by homopolyaddition of epoxides, such as ethylene oxide, propylene oxide, butylene oxide, trimethylene oxide, 3,3-bis(-chloromethyl)oxacyclobutane, tetrahydrofuran, styrene oxide, the bis-2,3-epoxypropyl ether of diphenylol propane or epichlorohydrin, e.g., in the presence of $BF_3$, or by the addition of these epoxides, either in a mixture or sequentially, to starting materials having reactive hydrogen atoms such as alcohols or amines, e.g., water, ethylene glycol, 1,3- or 1,3-propylene glycol, pentamethylene glycol, hexanediol, decamethylene glycol, trimethylolpropane, 4,4'-dihydroxydiphenylpropane, aniline, ammonia, ethanolamine, ethylenediamine, di($\beta$-hydroxypropyl)methylamine, di($\beta$-hydroxyethyl)aniline, hydrazine, as well as hydroxyalkylated phenols, such as O,O-di($\beta$-hydroxyethyl)resorcinol.

Polyurethanes containing hydroxyl groups and/or polyureas can also be used.

Mixtures of several materials can, of course, be used as polyhydroxy compounds.

Pigments and fillers as well as substances that improve flow and help avoid surface defects, such as silicone oil, p-toluenesulfonamide, liquid acrylate resins, plasticizers and catalysts, are among the auxiliary agents that may be used in the powdered binding agents of the invention.

The catalysts disclosed for the preparation of the uretidinedione polyaddition compounds are suitable catalysts.

The softening points of the polyurethane powder enamel components according to the invention are such that at temperatures between about 80° C. and about 120° C. additives necessary to produce the coating material of the invention can be worked in.

On the other hand, the softening points of the mixtures are such that they can be ground into lump-free, free-flowing powders with a particle size of about 20 to about 120 microns.

The powdered coating materials can be produced in suitable mixing devices, e.g., in stirred kettles, or mixing screws (extruders), and formed into powders, which can be applied to substrates by conventional procedures, particularly by electrostatic powder spraying.

The enamel films cure quickly when heated to temperatures above 120° C., preferably between about 160° C. and 200° C., to hard and smooth coatings.

as acetone, methylene chloride, toluene or xylene, to 50° C.-100° C. The glycol is added with brisk stirring and in an inert gas atmosphere to the uretidinedione diisocyanate so that the reaction temperature does not exceed 110° C. The reaction, which is monitored by titrimetric determination of NCO, is terminated after 2-5 hours at 110° C. After cooling and optionally evacuation and drying, and crushing, if necessary, the reaction product is obtained as a slightly yellowish, free-flowing powder. The IR-spectra of the cross linked adducts exhibit the characteristic strong bands of the uretidinedione group at 1760-1780 cm$^{-1}$.

| | Starting Components | Uretidinedione Adducts Reaction Products | | | | | |
|---|---|---|---|---|---|---|---|
| Example A (2) | IPDI-Uretidine- dione Mole | Diol Mole | Alcohol Mole | Total NCO % | Free NCO % | Melting Point °C. | DTA °C. |
| 1 | 3 | B* 2 | EH* 1 | 16.68 | 1.05 | 104-108 | 55-65 |
| 2 | 3 | B* 2 | EH* 2 | 15.21 | 0.48 | 95-100 | 53-58 |
| 3 | 4 | B* 3 | EH* 1 | 17.81 | 1.62 | 110-115 | 56-61 |
| 4 | 4.5 | B* 3.5 | EH* 1 | 17.88 | 1.2 | 107-118 | 62-69 |
| 5 | 4.5 | B* 3.5 | EH* 2 | 16.2 | 0.2 | 104-110 | 60-70 |
| 6 | 4.5 | B* 3.5 | M* 2 | 16.8 | 0.4 | 108-117 | 58-67 |
| 7 | 4.5 | B* 3.5 | E* 2 | 16.7 | 0.3 | 106-111 | 59-68 |
| 8 | 4.5 | EG* 3.5 | EH* 2 | 16.4 | 0.35 | 108-119 | 61-71 |
| 9 | 4.5 | HD* 3.5 | EH* 2 | 15.8 | 0.51 | 102-107 | 58-63 |
| 10 | 4.5 | MP* 3.5 | EH* 2 | 15.7 | 0.41 | 101-109 | 57-66 |
| 11 | 4.5 | B* 3.5 | M* 1 | 18.1 | 1.3 | 110-115 | 62-78 |

B* = butanediol-1,4;
EH* = 2-ethylhexanol;
EG* = ethylene glycol;
M* = methanol;
MP* = 3-methylpentanediol-1,5;
E* = ethanol;

PREPARATIVE EXAMPLES

A. Isocyanate Components (1) Preparation of the isophorone diisocyanate containing uretidinedione groups 100 parts by weight (p.b.w.) of IPDI were mixed with 0.1 p.b.w. of tris(dimethylamino)phosphine and allowed to stand at room temperature for 20 hours. The NCO content of this mixture after this time was 31% b.w., i.e., about 40% of the IPDI had reacted. This mixture was then subjected to thin film distillation at 130° C. and 0.1 torr. The residue was free of catalyst and had an NCO content of 17.6%. When the residue was heated at 180° C. for 30-60 minutes, the NCO content increased to 37.1-37.7%. This so-called "hot value" was a direct measure of the content of uretidinedione groups in the reaction product.

(2) Preparation of the IPDI-uretidinedione adducts

General preparation guidelines

The IPDI-uretidinedione diisocyanate produced according to A (1) is heated, optionally in a solvent such

B. Polyol components

General Preparation Guidelines

The starting materials, terephthalic acid (TA), dimethyl terephthalate (DMT), 1,6-hexanediol (HD), neopentyl glycol (NPG), 1,4-dimethylolcyclohexane (DMC) and trimethylolpropane (TMP) were placed in a reactor and heated by an oil bath. After the greater portion of the materials had melted, at a temperature of 160° C., 0.05% b.w. of di-n-butyltin oxide was added as a catalyst. The first methanol liberation occurred at a temperature of about 170° C. Over 6-8 hours, the temperature was raised to 220°-230° C. and the reaction was complete in another 12-15 hours. The polyester was cooled to 200° C. and its volatile components were largely removed by applying a vacuum (1 mm Hg) for 30-45 minutes. During the entire reaction time the material in the bottom of the reactor was stirred and a small N$_2$ stream was passed through the reaction mixture.

The following tables give the polyester compositions and the corresponding physical and chemical data.

| | Polyester | | | | | | | | | | |
|---|---|---|---|---|---|---|---|---|---|---|---|
| | Starting Components | | | | | | Chemical and Physical Data | | | | |
| Example | TA Mole | DMT Mole | HD Mole | NPG Mole | DMC Mole | TMP Mole | OH Number mg KOH/g | Acid No. mg KOH/g | Melting Point °C. | DTA °C. | Visc. at 160° C. mPa.s |
| 1 | 11 | 11 | 9.75 | 11 | — | 2.9 | 50–55 | 3–4 | ca. 75 | ca. 50 | ~22,000 |
| 2 | 10 | 10 | 6.25 | 10.5 | 2 | 2.9 | 55–60 | 2–4 | ca. 75 | ca. 50 | ~25,000 |
| 3 | 12 | 12 | 8 | 10.25 | 4.5 | 2.9 | 44–48 | 3–4 | ca. 75 | ca. 50 | ~25,000 |
| 4 | — | 9 | — | 4 | 3.75 | 2.5 | 100–105 | <2 | ca. 85 | ca. 59 | ~20,000 |

(C) Polyurethane powder enamels free of blocking agents

General Preparation Guidelines

The ground materials, adduct of the uretidinedione dimer of isophorone diisocyanate, polyester flow modifier masterbatch*, and catalyst masterbatch*, are thoroughly mixed, optionally with white pigment and optional fillers, in an edge mill and then homogenized in an extruder at 100°–130° C. After cooling, the extrudate is crushed and ground in a pin mill to a particle size of <100 microns. The powder produced in this manner is applied with an electrostatic powder sprayer at 60 KV onto degreased, optionally pre-treated, iron plates and baked in a recirculating dryer at temperatures between 160° and 200° C. The IR spectra of the powder enamels exhibit no NCO bands at 2400 cm$^{-1}$. The free NCO groups have reacted during the extrusion process.

*Flow Modifier Masterbatch
10% by weight of the flow modifier, a commercially available copolymer of butyl acrylate and 2-ethylhexyl acrylate, was homogenized in the polyester used in the melt and crushed after setting up.

*Catalyst Masterbatch
5–10% by weight of the catalyst, e.g., dibutyltin(IV) dilaurate, was homogenized in the polyester used in the melt and crushed after setting up.

The abbreviations in the following tables are:

| | | |
|---|---|---|
| CT | = coating thickness in micrometers | |
| HK | = Konig hardness in sec | (DIN 53 157) |
| HB | = Buchholz hardness | (DIN 53 153) |
| EC | = Erichsen cupping in mm | (DIN 53 156) |
| GT | = Incised grid test | (DIN 53 151) |
| GG 60° | = Gardner gloss | (ASTM-D 523) |
| Imp. | = Reverse impact in inch · lb | |

EXAMPLE 1

Pigmented Enamel

According to the described procedure a powder enamel having the following composition was prepared, applied and baked at between 160° C. and 200° C.
  181.34 p.b.w. Polyester according to Example B 2
  598.66 p.b.w. Uretidinedione-isocyanate adduct according to A 2)1
  600.00 p.b.w. White pigment (TiO$_2$)
  75.00 b.p.w. Flow modifier masterbatch
  45.00 p.b.w. Catalyst masterbatch

| Enameling Conditions | Mechanical Data | | | | | | |
|---|---|---|---|---|---|---|---|
| Time/Temp. | CT | HK | HB | EC | GS | Imp. rev. | GG 60° |
| 8'/200° C. | 60–80 | 174 | 91 | 7.5–8.1 | 0 | 60 | 89 |
| 10'/200° C. | 70–90 | 178 | 100 | 10.0–10.7 | 0 | 80 | 91 |
| 15'/200° C. | 55–85 | 177 | 111 | 10.5–11.1 | 0 | >82 | 90 |
| 15'/180° C. | 75–100 | 176 | 100 | 9.2–9.5 | 0 | 60 | 92 |
| 20'/180° C. | 70–80 | 175 | 91 | 9.7–10.7 | 0 | >82 | 91 |
| 25'/180° C. | 60–75 | 177 | 111 | 11.5 | 0 | >82 | 94 |
| 20'/170° C. | 55–85 | 179 | 111 | 8.9–9.6 | 0 | 50 | 89 |
| 25'/170° C. | 75–90 | 174 | 100 | 10.4–11.1 | 0 | 70 | 92 |
| 30'/170° C. | 65–80 | 180 | 100 | 10.8–11 | 0 | >82 | 91 |
| 30'/160° C. | 70 | 178 | 100 | 4.5–5.1 | 0 | 20 | 90 |
| 35'/160° C. | 70–80 | 176 | 91 | 6.9–7.1 | 0 | 30 | 92 |

EXAMPLE 2

Pigmented Enamel

According to the described procedure a powder enamel having the following composition was prepared, applied and baked at between 160° C. and 200° C.
  275.8 p.b.w. Polyester according to Example B 4
  504.2 p.b.w. Uretidinedione-isocyanate adduct according to A 2)1
  600.0 p.b.w. White pigment (TiO$_2$)
  75.0 p.b.w. Flow modifier masterbatch
  45.0 p.b.w. Catalyst masterbatch

| Enameling Conditions | Mechanical Data | | | | | | |
|---|---|---|---|---|---|---|---|
| Time/Temp. | CT | HK | HB | EC | GS | Imp. rev. | GG 60° |
| 8'/200° C. | 60–90 | 180 | 91 | 7.1–8.8 | 0 | 50 | 94 |
| 10'/200° C. | 80–90 | 184 | 100 | 9.4–10.1 | 0 | 70 | 90 |
| 15'/200 | 70–80 | 179 | 100 | 10.2–11.1 | 0 | >82 | 91 |
| 15'/180° C. | 70–85 | 180 | 100 | 6.8–.9 | 0 | 40 | 89 |
| 20'/180° C. | 90–100 | 178 | 100 | 9.4–10.2 | 0 | 70 | 91 |
| 25'/180° C. | 60–80 | 183 | 111 | 9.9–11 | 0 | >82 | 90 |
| 20'/170° C. | 70–90 | 184 | 91 | 6.9–7.5 | 0 | 50 | 90 |
| 25'/170° C. | 80–85 | 179 | 100 | 9.1–9.6 | 0 | 60 | 89 |
| 30'/170° C. | 60–70 | 181 | 100 | 10.2–10.5 | 0 | >82 | 91 |

EXAMPLE 3

Pigmented Enamel

According to the described procedure a powder enamel having the following composition was prepared, applied and baked at between 160° C. and 200° C.
  584.8 p.b.w. Polyester according to Example B 2
  195.2 p.b.w. Uretidinedione-isocyanate adduct according to A 2)2
  600.0 p.b.w. White pigment (TiO$_2$)
  75.0 p.b.w. Flow modifier masterbatch
  45.0 p.b.w. Catalyst masterbatch

| Enameling Conditions Time/Temp. | Mechanical Data | | | | | | |
|---|---|---|---|---|---|---|---|
| | CT | HK | HB | EC | GS | Imp. rev. | GG 60° |
| 8'/200° C. | 70–80 | 178 | 91 | 9.1–9.4 | 0 | 50 | 91 |

-continued

| Enameling Conditions Time/Temp. | Mechanical Data | | | | | | |
|---|---|---|---|---|---|---|---|
| | CT | HK | HB | EC | GS | Imp rev. | GG 60° |
| 10'/200° C. | 60–80 | 177 | 100 | 10.6 | 0 | >82 | 94 |
| 15'/200° C. | 70–90 | 180 | 100 | 10.7–11.1 | 0 | >82 | 90 |
| 15'/180° C. | 80 | 178 | 100 | 9.0–9.7 | 0 | 60 | 94 |
| 20'/180° C. | 60–75 | 181 | 100 | 9.4–10.0 | 0 | 80 | 92 |
| 25'/180° C. | 65–80 | 179 | 111 | 10.7 | 0 | >82 | 95 |
| 20'/170° C. | 80–90 | 176 | 91 | 8.9–9.7 | 0 | 70 | 90 |
| 25'/170° C. | 75–95 | 179 | 100 | 10.4–11.1 | 0 | >82 | 92 |
| 30'/170° C. | 60–80 | 177 | 100 | 10.2–11.4 | 0 | >82 | 91 |
| 30'/160° C. | 55–75 | 180 | 91 | 4.8–5.1 | 0 | 30 | 94 |
| 35'/160° C. | 60–75 | 177 | 91 | 7.2–7.5 | 0 | 30 | 93 |

EXAMPLE 4

Pigmented Enamel

According to the described procedure a powder enamel having the following composition was prepared, applied and baked at between 160° C. and 200° C.
  486.2 p.b.w. Polyester according to Example B 4
  293.8 p.b.w. Uretidinedione-isocyanate adduct according to A 2)2
  600.0 p.b.w. White pigment (TiO$_2$)
  75.0 p.b.w. Flow modifier masterbatch
  45.0 p.b.w. Catalyst masterbatch

| Enameling Conditions Time/Temp. | Mechanical Data | | | | | | |
|---|---|---|---|---|---|---|---|
| | CT | HK | HB | EC | GS | Imp. rev. | GG 60° |
| 8'/200° C. | 70–90 | 184 | 100 | 7.9–9.1 | 0 | 60 | 94 |
| 10'/200° C. | 80 | 187 | 100 | 10.6–11.5 | 0 | >82 | 92 |
| 15'/200° C. | 60–70 | 183 | 111 | 10.3–11 | 0 | >82 | 93 |
| 15'/180° C. | 60–80 | 182 | 101 | 8.2–8.8 | 0 | 50 | 90 |
| 20'/180° C. | 70–80 | 186 | 91 | 9.9–10.7 | 0 | 70 | 94 |
| 25'/180° C. | 65–85 | 184 | 111 | 10.2–10.8 | 0 | >82 | 92 |
| 20'/170° C. | 70–90 | 180 | 91 | 8.4–8.6 | 0 | 40 | 92 |
| 25'/170° C. | 80–100 | 182 | 111 | 10.5–10.8 | 0 | 70 | 89 |
| 30'/170° C. | 80 | 180 | 100 | 11.1–11.4 | 0 | >82 | 94 |
| 30'/160° C. | 70–90 | 181 | 91 | 4.2–4.4 | 0 | 20 | 91 |
| 35'/160° C. | 60–70 | 186 | 100 | 6.2–6.3 | 0 | 30 | 92 |

EXAMPLE 5

Pigmented Enamel

According to the described procedure a powder enamel having the following composition was prepared, applied and baked at between 160° C. and 200° C.
  627.9 p.b.w. Polyester according to Example B 3
  152.1 p.b.w. Uretidinedione-isocyanate adduct according to A 2)3
  600.0 p.b.w. White pigment (TiO$_2$)
  75.0 p.b.w. Flow modifier masterbatch
  45.0 p.b.w. Catalyst masterbatch

| Enameling Conditions Time/Temp. | Mechanical Data | | | | | | |
|---|---|---|---|---|---|---|---|
| | CT | HK | HB | EC | GS | Imp rev. | GG 60° |
| 8'/200° C. | 50–80 | 174 | 91 | 7.9–9.1 | 0 | 40 | 90 |
| 10'/200° C. | 70–90 | 178 | 100 | 9.4–10.7 | 0 | 80 | 89 |
| 15'/200° C. | 60–70 | 172 | 111 | 10.4–11.1 | 0 | >82 | 94 |
| 15'/180° C. | 55–75 | 181 | 100 | 9.0–9.2 | 0 | 60 | 92 |
| 20'/180° C. | 50–70 | 176 | 100 | 10.4–10.6 | 0 | >82 | 90 |
| 25'/180° C. | 60–80 | 178 | 100 | 10.0–11.0 | 0 | >82 | 94 |
| 20'/170° C. | 70–90 | 177 | 91 | 8.1–8.6 | 0 | 40 | 93 |
| 25'/170° C. | 60–70 | 180 | 91 | 9.9–10.5 | 0 | 70 | 90 |
| 30'/170° C. | 70–80 | 174 | 100 | 10.1–10.8 | 0 | >82 | 92 |
| 30'/160° C. | 50–60 | 176 | 91 | 5.1–6.1 | 0 | 30 | 91 |
| 35'/160° C. | 70 | 175 | 91 | 5.9–7.1 | 0 | 40 | 94 |

EXAMPLE 6

Pigmented Enamel

According to the described procedure a powder enamel having the following composition was prepared, applied and baked at between 160° C. and 200° C.
  608.45 b.p.w. Polyester according to Example B 2
  171.55 p.b.w. Uretidinedione-isocyanate adduct according to A 2)4
  600.00 p.b.w. White pigment (TiO$_2$)
  75.0 p.b.w. Flow modifier masterbatch
  45.0 p.b.w. Catalyst masterbatch

| Enameling Conditions Time/Temp. | Mechanical Data | | | | | | |
|---|---|---|---|---|---|---|---|
| | CT | HK | HB | EC | GS | Imp. rev. | GG 60° |
| 8'/200° C. | 60–90 | 174 | 91 | 8.9–9.4 | 0 | 60 | 88 |
| 10'/200° C. | 70–80 | 179 | 100 | 10.2–10.4 | 0 | 80 | 90 |
| 15'/200° C. | 80–100 | 176 | 100 | 9.9–11 | 0 | 80 | 92 |
| 15'/180° C. | 50–70 | 177 | 100 | 8.7–9.2 | 0 | 50 | 93 |
| 20'/180° C. | 70–80 | 180 | 91 | 10.0–10.5 | 0 | 70 | 89 |
| 25'/180° C. | 60–90 | 177 | 111 | 10.2–11.1 | 0 | >82 | 90 |
| 20'/170° C. | 60–80 | 178 | 91 | 8.4–8.8 | 0 | 40 | 94 |
| 25'/170° C. | 70–80 | 174 | 100 | 9.2–9.9 | 0 | 70 | 90 |
| 30'/170° C. | 80 | 179 | 100 | 10.1–10.9 | 0 | >82 | 93 |
| 30'/160° C. | 50–70 | 174 | 91 | 4.7–5.1 | 0 | 30 | 92 |
| 35'/160° C. | 70–80 | 179 | 100 | 5.2–6.2 | 0 | 40 | 94 |

EXAMPLE 7

Pigmented Enamel

According to the described procedure a powder enamel having the following composition was prepared, applied and baked at between 160° C. and 200° C.
  628.44 p.b.w. Polyester according to Example B 3
  151.56 p.b.w. Uretidinedione-isocyanate adduct according to A 2)4
  600.00 p.b.w. White pigment (TiO$_2$)
  75.00 p.b.w. Flow modifier masterbatch
  45.00 p.b.w. Catalyst masterbatch

| Enameling Conditions Time/Temp. | Mechanical Data | | | | | | |
|---|---|---|---|---|---|---|---|
| | CT | HK | HB | EC | GS | Imp rev. | GG 60° |
| 8'/200° C. | 70–90 | 178 | 91 | 8.7–9.2 | 0 | 60 | 91 |
| 10'/200° C. | 60–80 | 174 | 111 | 9.4–9.9 | 0 | 70 | 89 |
| 15'/200° C. | 80 | 177 | 100 | 10.1–10.7 | 0 | 82 | 92 |
| 15'/180° C. | 50–70 | 179 | 100 | 8.9–9.1 | 0 | 50 | 90 |
| 20'/180° C. | 70–90 | 179 | 91 | 9.2–10.1 | 0 | 80 | 88 |
| 25'/180° C. | 80–90 | 174 | 111 | 10.7–11.1 | 0 | >82 | 94 |
| 20'/170° C. | 90 | 176 | 100 | 7.2–8.4 | 0 | 40 | 92 |
| 25'/170° C. | 70–80 | 177 | 100 | 9.7–10.1 | 0 | >82 | 89 |
| 30'/170° C. | 60–80 | 174 | 100 | 10.0–11.1 | 0 | >82 | 89 |
| 30'/160° C. | 50–70 | 175 | 91 | 4.1–4.4 | 0 | 30 | 92 |
| 35'/160° C. | 70–90 | 178 | 100 | 5.2–5.7 | 0 | 30 | 90 |

EXAMPLE 8

Pigmented Enamel

According to the described procedure a powder enamel having the following composition was prepared, applied and baked at between 160° C. and 200° C.

596.98 p.b.w. Polyester according to Example B 1
183.02 p.b.w. Uretidinedione-isocyanate adduct according to A 2)5
600.0 p.b.w. White pigment (TiO$_2$)
75.0 p.b.w. Flow modifier masterbatch
45.0 p.b.w. Catalyst masterbatch

| Enameling Conditions Time/Temp. | Mechanical Data | | | | | | |
|---|---|---|---|---|---|---|---|
| | CT | HK | HB | EC | GS | Imp rev. | GG 60° |
| 8'/200° C. | 60-80 | 180 | 100 | 9.8-10.2 | 0 | 80 | 91 |
| 10'/200° C. | 70-90 | 179 | 100 | 10.2-10.8 | 0 | >82 | 94 |
| 15'/200° C. | 65-80 | 181 | 111 | >11.5 | 0 | >82 | 92 |
| 15'/180° C. | 70-80 | 182 | 100 | 9.4-9.9 | 0 | 70 | 96 |
| 20'/180° C. | 80 | 178 | 111 | 10.4-10.8 | 0 | >82 | 94 |
| 25'/180° C. | 60-80 | 180 | 111 | 10.7-11.4 | 0 | >82 | 95 |
| 20'/170° C. | 70-90 | 180 | 100 | 9.6-9.7 | 0 | 70 | 95 |
| 25'/170° C. | 60-80 | 179 | 100 | 10.2-10.7 | 0 | >82 | 94 |
| 30'/170° C. | 70-80 | 184 | 101 | 10.4-11.2 | 0 | >82 | 96 |
| 30'/160° C. | 60-70 | 183 | 100 | 5.8-6.2 | 0 | 40 | 96 |
| 35'/160° C. | 60-70 | 180 | 100 | 6.1-7.0 | 0 | 60 | 94 |

EXAMPLE 9

Pigmented Enamel

According to the described procedure a powder enamel having the following composition was prepared, applied and baked at between 160° C. and 200° C.

594.4 p.b.w. Polyester according to Example B 2
185.6 p.b.w. Uretidinedione-isocyanate adduct according to A 2)5
600.0 p.b.w. White pigment (TiO$_2$)
75.0 p.b.w. Flow modifier masterbatch
45.0 p.b.w. Catalyst masterbatch

| Enameling Conditions Time/Temp. | Mechanical Data | | | | | | |
|---|---|---|---|---|---|---|---|
| | CT | HK | HB | EC | GS | Imp rev. | GG 60° |
| 8'/200° C. | 60-80 | 181 | 100 | 9.9-10.2 | 0 | 80 | 95 |
| 10'/200° C. | 70-90 | 184 | 111 | >11.5 | 0 | >82 | 96 |
| 15'/200° C. | 60-70 | 182 | 111 | >11.5 | 0 | >82 | 96 |
| 15'/180° C. | 70 | 180 | 100 | 9.6-9.9 | 0 | 70 | 97 |
| 20'/180° C. | 70-90 | 179 | 111 | 10.4-11.1 | 0 | >82 | 96 |
| 25'/180° C. | 60-70 | 183 | 125 | >11.5 | 0 | | 95 |
| 20'/170° C. | 60-80 | 184 | 111 | 9.4-9.9 | 0 | 80 | 98 |
| 25'/170° C. | 50-70 | 186 | 125 | 10.2-10.9 | 0 | >82 | 97 |
| 30'/170° C. | 60-70 | 179 | 100 | 11.1-11.5 | 0 | >82 | 94 |
| 30'/160° C. | 50-70 | 180 | 91 | 6.2-6.8 | 0 | 50 | 95 |
| 35'/160° C. | 60-80 | 183 | 111 | 7.4-7.9 | 0 | 60 | 98 |

EXAMPLE 10

Pigmented Enamel

According to the described procedure a powder enamel having the following composition was prepared, applied and baked at between 160° C. and 200° C.

615.7 p.b.w. polyester according to Example B 3
164.3 p.b.w. Uretidinedione-isocyanate adduct according to A 25
600.0 p.b.w. White pigment (TiO$_2$)
75.0 p.b.w. Flow modifier masterbatch
45.0 p.b.w. Catalyst masterbatch

| Enameling Conditions Time/Temp. | Mechanical Data | | | | | | |
|---|---|---|---|---|---|---|---|
| | CT | HK | HB | EC | GS | Imp rev. | GG 60° |
| 8'/200° C. | 70-90 | 179 | 100 | 8.9-9.9 | 0 | 70 | 90 |
| 10'/200° C. | 60-80 | 181 | 100 | 10.2-10.8 | 0 | >82 | 92 |
| 15'/200° C. | 60-90 | 178 | 100 | >11.5 | 0 | >82 | 89 |
| 15'/180° C. | 65-75 | 179 | 100 | 9.2-9.8 | 0 | 70 | 96 |
| 20'/180° C. | 80-90 | 84 | 111 | 10.4-10.7 | 0 | >82 | 92 |
| 25'/180° C. | 60-80 | 179 | 111 | >11.5 | 0 | >82 | 94 |
| 20'/170° C. | 70-90 | 180 | 91 | 9.2-9.6 | 0 | 60 | 94 |
| 25'/170° C. | 55-85 | 182 | 100 | 10.4-10.7 | 0 | >82 | 94 |
| 30'/170° C. | 60-70 | 178 | 100 | 11.1-11.5 | 0 | >82 | 95 |
| 30'/160° C. | 70-80 | 181 | 91 | 5.1-5.7 | 0 | 40 | 92 |
| 35'/160° C. | 60-80 | 183 | 100 | 6.1-7.4 | 0 | 60 | 96 |

EXAMPLE 11

Pigmented Enamel

According to the described procedure a powder enamel having the following composition was prepared, applied and baked at between 160° C. and 200° C.

498.6 p.b.w. Polyester according to Example B 4
281.4 p.b.w. Uretidinedione-isocyanate adduct according to A 2)5
600.0 p.b.w. White pigment (TiO$_2$)
75.0 p.b.w. Flow modifier masterbatch
45.0 p.b.w. Catalyst masterbatch

| Enameling Conditions Time/Temp. | Mechanical Data | | | | | | |
|---|---|---|---|---|---|---|---|
| | CT | HK | HB | EC | GS | Imp rev. | GG 60° |
| 8'/200° C. | 60-70 | 186 | 91 | 7.8-8.4 | 0 | 60 | 95 |
| 10'/200° C. | 70-90 | 184 | 100 | 9.4-10.3 | 0 | >82 | 92 |
| 15'/200° C. | 65-85 | 188 | 100 | 10.2-11.1 | 0 | >82 | 92 |
| 15'/180° C. | 60-80 | 188 | 100 | 8.0-8.8 | 0 | 70 | 93 |
| 20'/180° C. | 60-80 | 187 | 100 | 9.4-10.1 | 0 | >82 | 90 |
| 25'/180° C. | 60-80 | 186 | 111 | 10.0-10.6 | 0 | >82 | 92 |
| 20'/170° C. | 70-90 | 180 | 100 | 7.9-8.2 | 0 | 60 | 94 |
| 25'/170° C. | 80-90 | 184 | 100 | 9.2-9.9 | 0 | 70 | 90 |
| 30'/170° C. | 60-70 | 185 | 100 | 9.9-10.5 | 0 | 80 | 95 |
| 30'/160° C. | 70-80 | 186 | 91 | 4.3-5.0 | 0 | 20 | 94 |
| 35'/160° C. | 75-90 | 184 | 100 | 5.2-5.9 | 0 | 40 | 96 |

EXAMPLE 12

Pigmented Enamel

According to the described procedure a powder enamel having the following composition was prepared, applied and baked at between 160° C. and 200° C.

599.7 p.b.w. Polyester according to Example B 2
180.3 p.b.w. Uretidinedione-isocyanate adduct according to A 2)6
600.0 p.b.w. White pigment (TiO$_2$)
75.0 p.b.w. Flow modifier masterbatch
45.0 p.b.w. Catalyst masterbatch

| Enameling Conditions Time/Temp. | Mechanical Data | | | | | | |
|---|---|---|---|---|---|---|---|
| | CT | HK | HB | EC | GS | Imp rev. | GG 60° |
| 8'/200° C. | 60-80 | 180 | 91 | 8.4-9.2 | 0 | 50 | 90 |
| 10'/200° C. | 70-80 | 178 | 100 | 10.2-10.5 | 0 | 70 | 94 |
| 15'/200° C. | 60-80 | 182 | 100 | 10.4-11.1 | 0 | >82 | 92 |
| 15'/180° C. | 50-70 | 176 | 100 | 9.2-9.4 | 0 | 70 | 89 |
| 20'/180° C. | 60-70 | 182 | 91 | 10.4-11.2 | 0 | >82 | 94 |
| 25'/180° C. | 65-80 | 179 | 100 | 10.0-10.9 | 0 | 80 | 93 |
| 20'/170° C. | 60-70 | 184 | 91 | 8.7-9.2 | 0 | 60 | 91 |
| 25'/170° C. | 70-90 | 180 | 100 | 9.4-9.9 | 0 | 70 | 89 |
| 30'/170° C. | 80-95 | 183 | 111 | 10.2-10.5 | 0 | 80 | 93 |
| 30'/160° C. | 60-80 | 181 | 91 | 4.5-4.8 | 0 | 30 | 92 |

-continued

| Enameling Conditions Time/Temp. | Mechanical Data ||||||
|---|---|---|---|---|---|---|
| | CT | HK | HB | EC | GS | Imp rev. | GG 60° |
| 35'/160° C. | 70–80 | 179 | 100 | 5.7–6.5 | 0 | 40 | 90 |

EXAMPLE 13

Pigmented Enamel

According to the described procedure a powder enamel having the following composition was prepared, applied and baked at between 160° C. and 200° C.

505.6 p.b.w. Polyester according to Example B 4
274.4 p.b.w. Uretidinedione-isocyanate adduct according to A 2)6
600.0 p.b.w. White pigment (TiO$_2$)
75.0 p.b.w. Flow modifier masterbatch
45.0 p.b.w. Catalyst masterbatch

| Enameling Conditions Time/Temp. | Mechanical Data |||||||
|---|---|---|---|---|---|---|---|
| | CT | HK | HB | EC | GS | Imp rev. | GG 60° |
| 8'/200° C. | 70 | 182 | 91 | 8.1–8.8 | 0 | 40 | 91 |
| 10'/200° C. | 60–90 | 187 | 100 | 9.5–10.0 | 0 | >70 | 96 |
| 15'/200° C. | 55–80 | 184 | 100 | 10.2–10.9 | 0 | >82 | 94 |
| 15'/180° C. | 60–80 | 186 | 100 | 7.9–8.7 | 0 | 40 | 94 |
| 20'/180° C. | 60–80 | 186 | 91 | 9.0–9.5 | 0 | 70 | 92 |
| 25'/180° C. | 70–80 | 188 | 100 | 10.2–10.7 | 0 | 80 | 94 |
| 20'/170° C. | 50–70 | 184 | 100 | 8.1–8.3 | 0 | 50 | 95 |
| 25'/170° C. | 70–90 | 180 | 100 | 9.4–10.0 | 0 | 60 | 91 |
| 30'/170° C. | 60–80 | 187 | 111 | 10.2–10.5 | 0 | 70 | 94 |
| 30'/160° C. | 50–70 | 183 | 91 | 3.9–4.5 | 0 | 20 | 90 |
| 35'/160° C. | 60–70 | 184 | 91 | 4.7–5.2 | 0 | 40 | 92 |

EXAMPLE 14

Pigmented Enamel

According to the described procedure a powder enamel having the following composition was prepared, applied and baked at between 160° C. and 200° C.

598.8 p.b.w. Polyester according to Example B 2
181.2 p.b.w. Uretidinedione-isocyanate adduct according to A 2)7
600.0 p.b.w. White pigment (TiO$_2$)
75.0 p.b.w. Flow modifier masterbatch
45.0 p.b.w. Catalyst masterbatch

| Enameling Conditions Time/Temp. | Mechanical Data |||||||
|---|---|---|---|---|---|---|---|
| | CT | HK | HB | EC | GS | Imp rev. | GG 60° |
| 8'/200° C. | 70–80 | 180 | 91 | 8.9–9.1 | 0 | 70 | 91 |
| 10'/200° C. | 80 | 178 | 100 | 9.8–10.7 | 0 | >82 | 94 |
| 15'/200° C. | 60–70 | 182 | 100 | 10.2–11.4 | 0 | >82 | 92 |
| 15'/180° C. | 55–85 | 181 | 100 | 9.2–10 | 0 | 70 | 94 |
| 20'/180° C. | 60–70 | 179 | 100 | 10.9–11.1 | 0 | >82 | 92 |
| 25'/180° C. | 70–80 | 178 | 111 | 11.0–11.5 | 0 | >82 | 94 |
| 20'/170° C. | 60–80 | 180 | 91 | 8.5–9.6 | 0 | 60 | 90 |
| 25'/170° C. | 65–80 | 184 | 100 | 10.4–10.5 | 0 | 80 | 93 |
| 30'/170° C. | 70–85 | 182 | 100 | 11.2–11.4 | 0 | >82 | 95 |
| 30'/160° C. | 50–70 | 181 | 91 | 4.5–5.1 | 0 | 40 | 92 |
| 35'/160° C. | 80–90 | 179 | 100 | 6.1–6.5 | 0 | 50 | 92 |

EXAMPLE 15

Pigmented Enamel

According to the described procedure a powder enamel having the following composition was prepared, applied and baked at between 160° C. and 200° C.

619.6 p.b.w. Polyester according to Example B 3
160.4 p.b.w. Uretidinedione-isocyanate adduct according to A 2)7
600.0 p.b.w. White pigment (TiO$_2$)
75.0 p.b.w. Flow modifier masterbatch
45.0 p.b.w. Catalyst masterbatch

| Enameling Conditions Time/Temp. | Mechanical Data |||||||
|---|---|---|---|---|---|---|---|
| | CT | HK | HB | EC | GS | Imp rev. | GG 60° |
| 8'/200° C. | 70–80 | 180 | 91 | 8.4–9.6 | 0 | 60 | 90 |
| 10'/200° C. | 60–70 | 185 | 100 | 9.7–10.3 | 0 | 70 | 94 |
| 15'/200° C. | 60–70 | 183 | 100 | 10.4–11.1 | 0 | >82 | 96 |
| 15'/180° C. | 50–80 | 186 | 100 | 8.7–9.1 | 0 | 70 | 96 |
| 20'/180° C. | 70–90 | 184 | 100 | 10.0–10.4 | 0 | 82 | 93 |
| 25'/180° C. | 60–80 | 184 | 111 | 10.7–11.5 | 0 | >82 | 95 |
| 20'/170° C. | 60–80 | 187 | 100 | 7.6–8.9 | 0 | 40 | 92 |
| 25'/170° C. | 70–80 | 182 | 100 | 9.2–10.0 | 0 | 70 | 90 |
| 30'/170° C. | 60–70 | 180 | 100 | 10.4–11 | 0 | >82 | 97 |
| 30'/160° C. | 70–85 | 182 | 91 | 4.2–5.1 | 0 | 30 | 93 |
| 35'/160° C. | 85–95 | 184 | 100 | 6.1–7.0 | 0 | 50 | 94 |

EXAMPLE 16

Pigmented Enamel

According to the described procedure a powder enamel having the following composition was prepared, applied and baked at between 160° C. and 200° C.

501 p.b.w. Polyester according to Example B 4
279 p.b.w. Uretidinedione-isocyanate adduct according to A 2)8
600 p.b.w. White pigment (TiO$_2$)
75 p.b.w. Flow modifier masterbatch
45 p.b.w. Catalyst masterbatch

| Enameling Conditions Time/Temp. | Mechanical Data |||||||
|---|---|---|---|---|---|---|---|
| | CT | HK | HB | EC | GS | Imp rev. | GG 60° |
| 8'/200° C. | 70–80 | 184 | 91 | 7.9–8.9 | 0 | 50 | 92 |
| 10'/200° C. | 80–90 | 188 | 100 | 8.8–9.8 | 0 | 70 | 90 |
| 15'/200° C. | 60–80 | 186 | 100 | 9.5–10.3 | 0 | >82 | 94 |
| 15'/180° C. | 70–85 | 190 | 100 | 7.7–8.4 | 0 | 40 | 94 |
| 20'/180° C. | 70–80 | 187 | 91 | 9.2–9.4 | 0 | 60 | 90 |
| 25'/180° C. | 60–90 | 185 | 111 | 9.7–10.0 | 0 | 80 | 95 |
| 20'/170° C. | 80–90 | 187 | 100 | 7.9–8.4 | 0 | 50 | 92 |
| 25'/170° C. | 70–100 | 186 | 91 | 8.0–8.9 | 0 | 50 | 94 |
| 30'/170° C. | 65–80 | 190 | 100 | 9.7–10.0 | 0 | >82 | 93 |
| 30'/160° C. | 70–90 | 189 | 91 | 4.1–4.5 | 0 | 20 | 93 |
| 35'/160° C. | 60–80 | 188 | 100 | 5.7–6.3 | 0 | 30 | 92 |

EXAMPLE 17

Pigmented Enamel

According to the described procedure a powder enamel having the following composition was prepared, applied and baked at between 160° C. and 200° C.

590.7 p.b.w. Polyester according to Example B 2
189.3 p.b.w. Uretidinedione-isocyanate adduct according to A 2)9
600.0 p.b.w. White pigment (TiO$_2$)
75.0 p.b.w. Flow modifier masterbatch
45.0 p.b.w. Catalyst masterbatch

| Enameling Conditions Time/Temp. | CT | HK | HB | EC | GS | Imp rev. | GG 60° |
|---|---|---|---|---|---|---|---|
| 8'/200° C. | 60-80 | 179 | 91 | 9.4-10.1 | 0 | 70 | 91 |
| 10'/200° C. | 60-70 | 177 | 100 | 9.6-10.7 | 0 | >82 | 94 |
| 15'/200° C. | 60-80 | 180 | 111 | 10.7-11.4 | 0 | >82 | 96 |
| 15'/180° C. | 55-75 | 174 | 100 | 9.0-9.9 | 0 | 60 | 93 |
| 20'/180° C. | 70-90 | 176 | 111 | 10.7-11.0 | 0 | >82 | 90 |
| 25'/180° C. | 60-70 | 173 | 111 | 11.5 | 0 | >82 | 95 |
| 20'/170° C. | 80 | 180 | 91 | 8.9-9.6 | 0 | 60 | 92 |
| 25'/170° C. | 60-80 | 176 | 100 | 9.4-10.2 | 0 | 80 | 97 |
| 30'/170° C. | 70-90 | 179 | 100 | 10.4-11.2 | 0 | >82 | 91 |
| 30'/160° C. | 70-90 | 177 | 91 | 4.8-5.7 | 0 | 30 | 93 |
| 35'/160° C. | 60-80 | 175 | 100 | 6.1-7.0 | 0 | 50 | 95 |

EXAMPLE 18

Pigmented Enamel

According to the described procedure a powder enamel having the following composition was prepared, applied and baked at between 160° C. and 200° C.
612.3 p.b.w. Polyester according to Example B 3
167.7 p.b.w. Uretidinedione-isocyanate adduct according to A 2)9
600.0 p.b.w. White pigment (TiO$_2$)
75.0 p.b.w. Flow modifier masterbatch
45.0 p.b.w. Catalyst masterbatch

| Enameling Conditions Time/Temp. | CT | HK | HB | EC | GS | Imp rev. | GG 60° |
|---|---|---|---|---|---|---|---|
| 8'/200° C. | 70-90 | 178 | 91 | 8.7-9.5 | 0 | 60 | 91 |
| 10'/200° C. | 80 | 177 | 100 | 9.4-10.1 | 0 | 80 | 91 |
| 15'/200° C. | 60-80 | 180 | 100 | 10.7-11.1 | 0 | >82 | 90 |
| 15'/180° C. | 70-80 | 180 | 100 | 8.1-8.8 | 0 | 40 | 94 |
| 20'/180° C. | 60-70 | 176 | 100 | 9.2-10.1 | 0 | 70 | 90 |
| 25'/180° C. | 80-95 | 179 | 100 | 10.2-10.9 | 0 | >82 | 94 |
| 20'/170° C. | 70-90 | 177 | 91 | 7.9-9.1 | 0 | 30 | 94 |
| 25'/170° C. | 80-100 | 181 | 100 | 8.8-10.0 | 0 | 70 | 92 |
| 30'/170° C. | 60-80 | 179 | 100 | 10.0-11.0 | 0 | 82 | 90 |
| 30'/160° C. | 55-75 | 180 | 91 | 3.8-5.0 | 0 | 20 | 93 |
| 35'/160° C. | 60-70 | 178 | 100 | 5.1-6.7 | 0 | 40 | 92 |

EXAMPLE 19

Pigmented Enamel

According to the described procedure a powder enamel having the following composition was prepared, applied and baked at between 160° C. and 200° C.
610.2 p.b.w. Polyester according to Example B 2
169.8 p.b.w. Uretidinedione-isocyanate adduct according to A 2)11
600.0 p.b.w. White pigment (TiO$_2$)
75.0 p.b.w. Flow modifier masterbatch
45.0 p.b.w. Catalyst masterbatch

| Enameling Conditions Time/Temp. | CT | HK | HB | EC | GS | Imp rev. | GG 60° |
|---|---|---|---|---|---|---|---|
| 8'/200° C. | 50-70 | 179 | 91 | 9.1-9.6 | 0 | 70 | 92 |
| 10'/200° C. | 60-80 | 174 | 100 | 10.4-10.7 | 0 | >82 | 97 |
| 15'/200° C. | 50-75 | 180 | 111 | 10.2-11.1 | 0 | >82 | 94 |
| 15'/180° C. | 60-70 | 173 | 100 | 9.4-10.0 | 0 | 60 | 94 |
| 20'/180° C. | 60-70 | 178 | 111 | 9.7-10.5 | 0 | >82 | 93 |
| 25'/180° C. | 70-80 | 177 | 111 | 10.4-11.1 | 0 | >82 | 91 |
| 20'/170° C. | 70 | 181 | 100 | 8.9-9.9 | 0 | 60 | 93 |
| 25'/170° C. | 60-70 | 176 | 111 | 10.1-10.3 | 0 | 80 | 92 |
| 30'/170° C. | 50-80 | 179 | 125 | 10.4-11.5 | 0 | >82 | 96 |
| 30'/160° C. | 60-70 | 170 | 91 | 4.1-5.1 | 0 | 30 | 94 |
| 35'/160° C. | 65-80 | 179 | 100 | 5.7-6.8 | 0 | 40 | 95 |

EXAMPLE 20

Pigmented Enamel

According to the described procedure a powder enamel having the following composition was prepared, applied and baked at between 160° C. and 200° C.
629.97 p.b.w. Polyester according to Example B 3
150.03 p.b.w. Uretidinedione-isocyanate adduct according to A 2)11
600.00 p.b.w. White pigment (TiO$_2$)
75.00 p.b.w. Flow modifier masterbatch
45.00 p.b.w. Catalyst masterbatch

| Enameling Conditions Time/Temp. | CT | HK | HB | EC | GS | Imp rev. | GG 60° |
|---|---|---|---|---|---|---|---|
| 8'/200° C. | 70-90 | 174 | 91 | 8.7-9.6 | 0 | 60 | 91 |
| 10'/200° C. | 60-80 | 177 | 100 | 9.3-9.9 | 0 | 60 | 93 |
| 15'/200° C. | 70 | 181 | 111 | 10.0-10.7 | 0 | >82 | 97 |
| 15'/180° C. | 70 | 181 | 100 | 8.9-10.0 | 0 | >82 | 94 |
| 20'/180° C. | 80 | 179 | 111 | 9.7-10.0 | 0 | 80 | 92 |
| 25'/180° C. | 60-70 | 172 | 125 | 10.1-11.0 | 0 | 82 | 96 |
| 20'/170° C. | 90 | 180 | 100 | 8.1-9.1 | 0 | 60 | 91 |
| 25'/170° C. | 60-80 | 180 | 91 | 9.4-10.0 | 0 | 70 | 94 |
| 30'/170° C. | 70-90 | 177 | 100 | 10.7-11.4 | 0 | >82 | 93 |
| 30'/160° C. | 65-85 | 176 | 91 | 4.5-6.1 | 0 | 30 | 90 |
| 35'/160° C. | 70-95 | 179 | 100 | 5.7-6.8 | 0 | 50 | 95 |

The sprayable polyurethane powders free of blocking agents exhibit very good to outstanding pourability after 7 days of storage at 40° C.; after 28 days in storage the pourability is still good.

The enamel films were uniform and free of pits and bubbles. The surface shows good to very good leveling. Depending on the OH functionality and the free NCO content of the uretidinedione-containing adduct a mild to slight orange-peel effect was observed.

Exposure for one year to open weathering in an industrial environment caused no change in flexibility, hardness and adhesion. In testing by the Xenotest 450 LF after up to 3000 hours according to DIN 53 231 the results were excellent. Gloss, hardness and flexibility underwent no change.

Having now fully described the invention, it will be apparent to one of ordinary skill in the art that many changes and modifications can be made thereto without departing from the spirit or scope of the invention as set forth herein.

We claim:

1. A process for preparing polyurethane powder enamles free of cleavage products selected from monoalcohols, primary or secondary amines, having good storage stability, which are curable above 120° C., and which are linear polyisocyanate addition products which are irreversibly, partially or completely, blocked and which contain uretidinedione groups, characterized in that, a. linear isophorone diisocyanate-diol polyaddition adducts which are irreversibly, partially or completely, blocked with terminal monoalcohols or monoamines and which contain uretidinedione groups, whose uretidinedione groups are essentially free from isocyanurate groups and are derived from isophorone diisocyanate which can be more than 98% decomposed back into isophorone diisocyanate by heating, having the following formula:

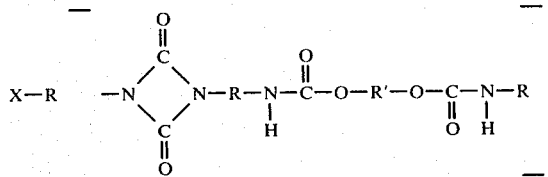

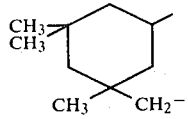

wherein
R =

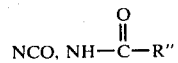

X =

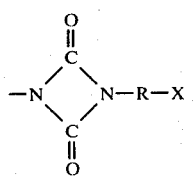

R' = a divalent aliphatic, cycloaliphatic, aromatic or araliphatic hydrocarbon radical of a diol, n>1, R" = a monoalcohol radical or primary or secondary monoamine radical having 1–30 C-atoms, having an NCO/OH ratio or uretidinedione dimer of isophorone diisocyanate to diol of 1:0.5 to 1:0.9, preferably 1:0.6 to 1:0.8, a uretidinedione/diol molar ratio between 2:1 and 6:5, preferably 3:2 to 5:4, a molecular weight between 550 and 4300, preferably between 1500 and 2000, and a melting point of ≧70° C. to ≦130° C., preferably 80° C. to 120° C., b. polyhydroxy compounds having an OH functionality of ≧3.4 to ≦7, preferably 3.7 to 4.5, an average molecular weight of 2000 to 5000, preferably 2500 to 4500, a hydroxyl number between 30 and 100 mg KOH/g, preferably between 40 and 80 mg KOH/g, a viscosity of <100,000 mPa s preferably <40,000 mPa s at 160° C. and a melting point of ≦70° C. to ≦120° C., preferably 75° C. to 100° C., and c. the additives customary in polyurethane chemistry, are reacted, wherein the molar ratio of a. and b. is selected so that the NCO/OH ratio is 0.8:1 to 1.2:1.

2. Polyurethane powder enamels prepared according to claim 1.

3. A polyurethane powder enamel free of volatile cleaverage products selected from monoalcohols or primary or secondary amines comprising:

a. a partially or completely blocked adduct of the uretidinedione dimer of isophorone diisocyanate, essentially free from isocyanurate groups, with a diol, wherein said adduct has the formula:

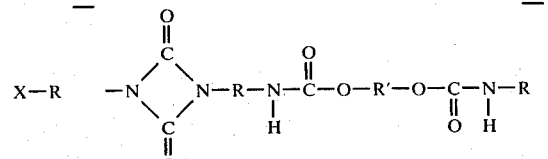

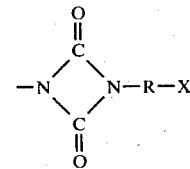

wherein
R =

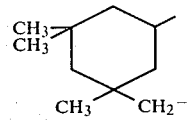

X = NCO or $$-NH-\overset{\overset{O}{\|}}{C}-R''$$

R' = a divalent aliphatic cycloaliphatic, aromatic or araliphatic hydrocarbon radical of a diol, n>1, and R"-a monoalcohol radical or primary or secondary monoamine radical with 1–30 C-atoms, the NCO/OH ratio of said dimer to said diol is from 1:0.5 to 1:0.9, the dimer-diol molar ratio is from 2:1 to 6:5, the average molecular weight is between 550 and 4300, and the melting point is ≧70° C. and ≦130° C., and wherein the uretidinedione groups present in said adduct are cleavable with heat into ≧98% —NCO groups, and b. a polyol having an OH functionality >3.4 to <7, an average molecular weight of 2000 to 5000, an OH number between 30 and 100 mg KOH/g, a viscosity of <100,000 mPa s at 160° C., and a melting point ≧70° C. and ≦120° C., c. the additives customary in polyurethane chemistry, wherein the mole ratio of said adduct to said polyol is chosen so that the ratio of NCO groups in said adduct to OH groups in said polyol is from 0.8:1 to 1.2:1.

4. The powder enamel of claim 3, wherein the NCO/OH ratio of said dimer to said diol is from 1:0.6 to 1:0.8.

5. The powder enamel of claim 3, wherein the dimer/diol molar ratio is ferom 3:2 to 5:4.

6. The powder enamel of claim 3, wherein the melting point of said adduct is from 85° C. to 120° C.

7. The powder enamel of claim 3, wherein the OH functionality of said polyol is from 3.7 to 4.5.

8. The powder enamel of claim 3, wherein the average molecular weight of said polyol is from 2500 to 4500.

9. The powder enamel of claim 3, wherein said OH number is between 40 and 80 mg KOH/g.

10. The powder enamel of claim 3, wherein said viscosity is <40,000 mPas.s at 160° C.

11. The powder enamel of claim 3, wherein the melting point of said polyol is from 75° C. to 100° C.

12. The powder enamel of claim 3, wherein said powder enamel additionally comprises an additive common to polyurethane chemistry.

13. The powder enamel of claim 3, wherein said additive is a pigment, a spreading agent, a softener, or a catalyst.

14. A polyurethane enamel coating produced from the powder enamel of claim 3.

* * * * *